March 17, 1925. 1,529,818

C. F. TUTTLE

POP TYPE PRESSURE AND VACUUM GAS RELIEF VALVE FOR TANKS

Filed Nov. 18, 1924

Inventor
CHARLES F. TUTTLE.

By Lyon & Lyon
Attorneys

Patented Mar. 17, 1925.

1,529,818

UNITED STATES PATENT OFFICE.

CHARLES F. TUTTLE, OF RICHMOND, CALIFORNIA, ASSIGNOR TO STANDARD OIL COMPANY, OF SAN FRANCISCO, CALIFORNIA, A CORPORATION OF CALIFORNIA.

POP-TYPE-PRESSURE AND VACUUM-GAS-RELIEF VALVE FOR TANKS.

Application filed November 18, 1924. Serial No. 750,543.

*To all whom it may concern:*

Be it known that I, CHARLES F. TUTTLE, a citizen of the United States, residing at Richmond, in the county of Contra Costa and State of California, have invented a new and useful Pop-Type-Pressure and Vacuum-Gas-Relief Valve for Tanks, of which the following is a specification.

This invention relates to a valve for use upon oil tanks or gas gathering lines from tanks.

An object of this invention is to provide a valve with a positive acting combination pressure and vacuum releasing means which is liquid sealed and so designed and arranged that possibility of the different parts sticking or failing to operate from other causes, such as the corrosive action of the gases handled, is substantially eliminated.

Another object of the invention is to provide a positively acting combination pressure and vacuum gas relief valve which will positively be maintained closed against leakage of gas through the valve until the opening pressures of the pressure or vacuum valve are exceeded and which will close positively as soon as the pressure drops below a predetermined amount.

Another object of the invention is to provide a valve so constructed that blowing out of the liquid seal in the valve is prevented during operation.

Various other objects and advantages of the invention will appear from the following description of a preferred form of the invention as shown in the accompanying drawings.

Figure 1:
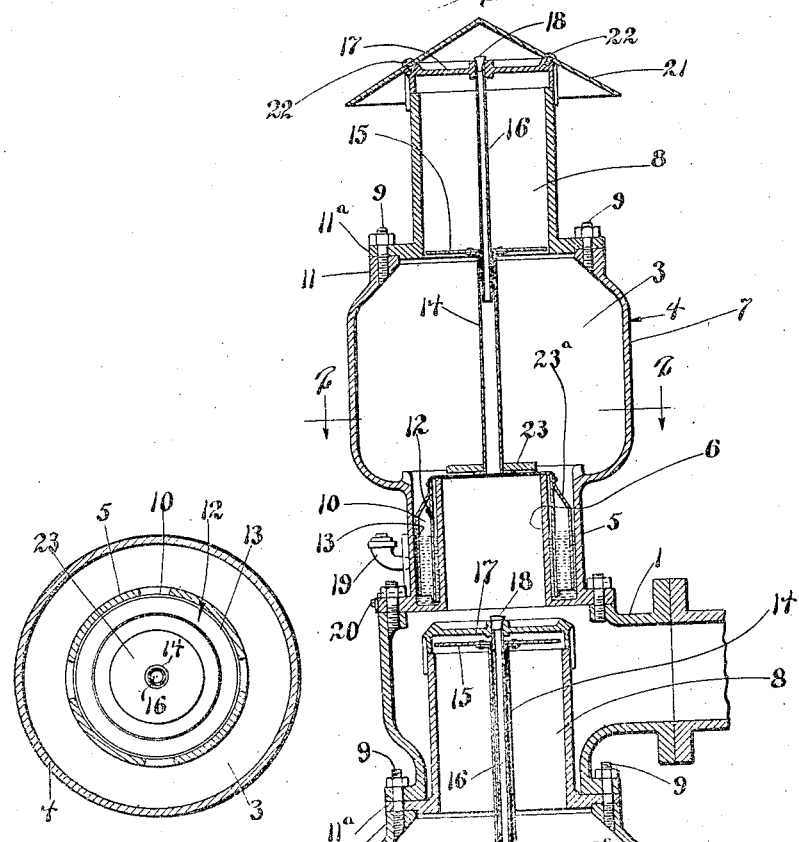
Fig. 1 is an elevation in vertical section of such combined pop type pressure and vacuum relief valves.
Figure 2:
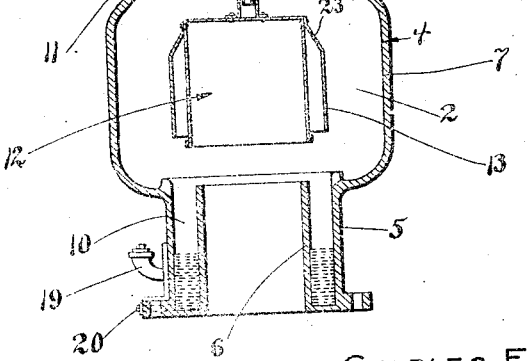
Fig. 2 is a transverse section on the line 2—2 of Fig. 1.

Referring to the drawings, the valve comprises a connecting T 1 by which the valve may be connected to a tank or line served by the valve. The connecting T 1 also serves to support the pressure and vacuum valve assemblies.

The valve comprises a vacuum releasing device 2 and a pressure releasing device 3, which devices are substantially identical in construction. The pressure releasing device is indicated as above the T 1 and the vacuum releasing device as below the T 1. Each assembly comprises a valve body 4 of suitable material such as cast iron. The valve bodies have lower vertical cylindrical extensions 5 connected at their lower end to vertical sleeves 6 within the extensions 5, the extensions 5 and the sleeves 6 thus forming annular oil seal wells 10. The bodies 4 are enlarged above the extensions 5, as indicated at 7, and the upper ends of the bodies are connected to vertical tubular blow down chambers 8 preferably of cast aluminum, such chambers being held to the bodies by bolts 9 extending through corresponding flanges 11 and 11ª on the bodies 4 and blow down chambers 8.

The blow down chamber 8 of the vacuum releasing device 2 is connected to the lower end of the T 1 and the chamber 8 extends within the T as shown in Fig. 1. Each of the devices 2 and 3 comprise seamless bells 12 preferably of pressed aluminum, such bells being provided with skirts 13, the lower ends of which terminate slightly above the lower edges of the bells 12. The bells 12 are connected to tubular valve stems 14 preferably of aluminum, such tubular valve stems extending vertically above the valves and are provided at their upper ends with blow down discs 15 also preferably of aluminum. The valve bells 12, discs 15 and tubular valve stems 14 are guided centrally by valve guides 16 depending through the blow down chambers 8 from yokes 17 at the upper ends of the blow down chambers, the guide rods 16 being preferably of aluminum and the yokes 17 being preferably integral with the blow down chambers 8. The guide rods 16 are held securely to the yokes 17 by plugs 18 of wood or other suitable material.

The sealing oil level within the oil seal wells 10 may be inspected and maintained through connections 19 and the wells may be cleansed out through drain connections 20.

The yoke 17 of the pressure release device is covered by a hood 21 attached thereto by any suitable means such as screws 22.

In Fig. 1 the vacuum release bell 12 is shown in the opened position, whereas the pressure release bell 12 is shown in the closed position. It is generally preferable to provide a greater force tending to maintain the pressure release device closed than that maintaining the vacuum release device closed. For this purpose, weights 23 are usually placed on the top of the pressure release bell 12.

In operation, both of the valves are normally in their closed position. For example, when the pressure in the tank or line connected with the T 1 rises, such pressure acts through the tube 6 of the pressure release device to depress the oil between the bell 12 and tube 6 of such device until the pressure acting on the area of the bell is sufficient to balance the weight of the bell, skirt, stem and disc. The bell then rises until its bottom edge comes to the surface of the sealing oil between the bell and tube 6. Gas or vapor admitted through the T 1 then is permitted to bubble into the space between the bell 12 and its skirt 13. The height of the oil seal surface between the skirt and cylinder extension 5 of the body 2 is then equal to the so-called pop pressure head above the bottom of the bell and thereby forms of the skirt a piston with an oil seal between it and the walls of the oil seal well 10. The gas bubbling under the edge of the bell and into the skirt 13 applies the so-called pop pressure to the total area of the bell and skirt giving a resultant upward force materially in excess of the weight of the bell, skirt, stem and disc, thereby causing such parts to pop to the wide open position. In such position, the gas or vapor passes around the bell and skirt and escapes through the enlargement 7 of the body through the space between the blow down chamber and blow down disc 15 into the atmosphere.

The gas is released at constant pressures for quantities within the capacity of the valve, the height of the blow down disc 15 above the top of the blow down chamber varying with the quantity to be released until this quantity can just be handled by the clearance between the blow down disc and chamber walls. The disc 15 and bell 12 then slowly settle down until the bell 12 touches the surface of oil within the oil well seal 10. This causes a reduction of pressure under the disc and as the blow down pressure acting only on the area of the bell will not support the weight of the bell 12, skirt 13, stem 14 and disc 15, the bell 12 will settle in the oil seal well 10 and close completely, the gas between the bell and skirt escaping through a few small vents 23ª disposed in the upper part of the skirt 13.

The vacuum valve acts similarly when the pressure in the tank or line connected with the T 1 is reduced sufficiently below atmospheric to produce the pressure differential, at which the vacuum release device 2 pops. Loss of sealing oil from the device is prevented by the provision of large gas passages around the bells 12 and skirts 13. Any oil adhering to these parts when the device pops will be blown against the valve body walls by gas moving at relatively low velocities and thus not be carried out of the valve.

The possibility of sticking of the valve caused by corrosive gases is practically eliminated by making of aluminum all moving parts which come in contact with other parts.

The invention is of the scope set forth in the appended claims.

I claim:

1. A device of the class described comprising a T, pressure release and vacuum release devices connected to the T, such devices each including an oil well seal, a bell carrying a skirt movable into the seal, a stem connected to the bell and carrying a blow down disc, and a blow down chamber within which the disc reciprocates, the pressure release device being connected to the T so as to apply pressure therein against the bell and the vacuum release device being connected to the T so that the pressure of the atmosphere is applied to the valve.

2. A device of the class described, comprising an oil well seal, a bell carrying a skirt movable into the seal, a stem connected to the bell and carrying a blow down disc, and a blow down chamber within which the disc reciprocates.

3. A device of the class described, comprising an annular oil well seal, a bell carrying a skirt movable into the seal, means for directing fluid pressure onto said bell, a stem connected to the bell and carrying a blow down disc, and a chamber operative to rapidly blow down said disc in closing the device.

4. In a device adapted to jerk or pop open and close as the difference between the external and internal pressure of a line or tank connected with the device exceeds a predetermined pressure, a bell having a skirt, means directing one of said pressures within the bell and the other pressure to the outside of the bell, an annular oil well seal into which said bell and skirt is movable, a chamber through which fluid must pass to exert pressure on the exterior of such bell, and a disc movable through such chamber and rigid with said bell.

Signed at Richmond, California this 31st day of October 1924.

CHARLES F. TUTTLE